US012172178B2

(12) United States Patent
Churchill

(10) Patent No.: US 12,172,178 B2
(45) Date of Patent: Dec. 24, 2024

(54) TELESCOPIC FOUNTAIN NOZZLE WITH DISCRETE EXTENSION AND WATER ACTIVATION

(71) Applicant: Universal City Studios LLC, Universal City, CA (US)

(72) Inventor: David Michael Churchill, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 606 days.

(21) Appl. No.: 16/545,175

(22) Filed: Aug. 20, 2019

(65) Prior Publication Data

US 2020/0078816 A1 Mar. 12, 2020

Related U.S. Application Data

(60) Provisional application No. 62/727,598, filed on Sep. 6, 2018.

(51) Int. Cl.
*B05B 17/08* (2006.01)
*B05B 15/72* (2018.01)

(52) U.S. Cl.
CPC .............. *B05B 17/08* (2013.01); *B05B 15/72* (2018.02)

(58) Field of Classification Search
CPC ......... B05B 17/08; B05B 15/72; B05B 15/68; B05B 12/04; B05B 15/70; B05B 15/656
USPC ........................................................... 239/12
See application file for complete search history.

(56) References Cited

U.S. PATENT DOCUMENTS

| | | | | |
|---|---|---|---|---|
| 3,722,816 | A | 3/1973 | Stewart et al. | |
| 4,174,808 | A | 11/1979 | Latia | |
| 4,272,023 | A | 6/1981 | Georgiev et al. | |
| 4,628,548 | A | 12/1986 | Kurosawa et al. | |
| 5,765,238 | A | 6/1998 | Furukawa et al. | |
| 5,953,765 | A * | 9/1999 | Hayashi | E03D 9/08 4/420.4 |
| 6,161,771 | A * | 12/2000 | Henry | B05B 17/085 239/233 |

(Continued)

FOREIGN PATENT DOCUMENTS

| | | |
|---|---|---|
| CN | 106975583 | 7/2017 |
| CN | 206746904 U | 12/2017 |

(Continued)

OTHER PUBLICATIONS

Machine translation of JPH01207156 description, Apr. 29, 2021, Espacenet, 5 pages (Year: 2021).*

(Continued)

*Primary Examiner* — Christopher R Dandridge
*Assistant Examiner* — Kevin Edward Schwartz
(74) *Attorney, Agent, or Firm* — Fletcher Yoder, P.C.

(57) ABSTRACT

A fountain system is provided. The fountain system includes a fountain nozzle that includes a body configured to telescope during extension and retraction and a nozzle outlet coupled to an end of the body. The fountain system also includes an extension system configured to actuate the extension and retraction of the body. The fountain system also includes an actuation system configured to activate discharge of a liquid, such as water, from the nozzle outlet. The extension system and the actuation system are discrete systems.

7 Claims, 4 Drawing Sheets

(56) References Cited

U.S. PATENT DOCUMENTS

| | | | | | |
|---|---|---|---|---|---|
| 6,161,988 | A * | 12/2000 | Pawluk | A63B 47/02 405/74 |
| 6,447,205 | B1 * | 9/2002 | Pawluk | A63B 47/02 405/74 |
| 7,121,478 | B1 * | 10/2006 | Jones | B05B 15/74 239/203 |
| 7,775,457 | B2 * | 8/2010 | Schnuckle | B05B 17/08 239/12 |
| 2002/0044834 | A1 * | 4/2002 | Pawluk | E04H 4/108 405/66 |
| 2009/0250528 | A1 * | 10/2009 | Schnuckle | B05B 17/08 239/18 |
| 2017/0203318 | A1 | 7/2017 | Vähänen et al. | |
| 2019/0091716 | A1 * | 3/2019 | Fuller | B63B 35/00 |

FOREIGN PATENT DOCUMENTS

| | | | |
|---|---|---|---|
| DE | 3728415 | | 11/1988 |
| JP | H01207156 | | 8/1989 |
| JP | H01207156 | A | 8/1989 |
| JP | H0663167 | A | 9/1994 |
| JP | H10323595 | A | 12/1998 |

OTHER PUBLICATIONS

Machine translation of CN10697558 description, Apr. 28, 2021, Google Patents, 6 pages (Year: 2021).*

PCT/US2019/049470 International Search Report and Written Opinion Nov. 14, 2019.

CN 201980057849.3 Office Action mailed May 26, 2022.

JP Office Action for Japanese Application No. 2021-511560 mailed Aug. 9, 2023.

* cited by examiner

TELESCOPIC FOUNTAIN NOZZLE WITH DISCRETE EXTENSION AND WATER ACTIVATION

CROSS REFERENCE TO RELATED APPLICATIONS

This application claims priority to and the benefit of U.S. Provisional Application No. 62/727,598, entitled "TELESCOPIC FOUNTAIN NOZZLE WITH DISCRETE EXTENSION AND WATER ACTIVATION," filed Sep. 6, 2018, which is hereby incorporated by reference in its entirety for all purposes.

BACKGROUND

The present disclosure relates generally to the field of amusement attractions. More specifically, embodiments of the present disclosure relate to a water attraction with a telescopic fountain nozzle.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Amusement parks contain a variety of attractions providing unique experiences to each park guest. Among these attractions are water attractions. These water attractions may utilize fountains, for example, during a show. However, typically, these fountains either remain visible when not in use, or require large systems to raise and lower them relative to the water's surface, and thus, a problem with a single platform of this system can keep the fountains associated with that platform from being utilized during the show. With the increasing sophistication and complexity of modern attractions, and the corresponding increase in expectations among amusement park and/or theme park guests, improved and more creative attractions are needed, including attractions that provide a unique guest experience. With a more sophisticated and demanding audience, it is increasingly important to elegantly conceal technical equipment, so one does not take away from the performance, as well as remove risk of a large-scale technical failure, such as the favor of all of the fountains associated with a platform, in favor of smaller risks that are easier to overcome during the live performance.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a fountain system is provided. The fountain system includes a fountain nozzle that includes a body configured to telescope during extension and retraction, and a nozzle outlet coupled to an end of the body. The fountain system also includes an extension system configured to actuate the extension and retraction of the body. The fountain system also includes an actuation system configured to activate discharge of a liquid from the nozzle outlet. The extension system and the actuation system are discrete systems.

In another embodiment, a modular fountain system is provided. The modular fountain system includes multiple fountain nozzles. Each fountain nozzle of the multiple fountain nozzles includes a body configured to telescope during extension and retraction, and a nozzle outlet coupled to an end of the body. The modular fountain system also includes a control system coupled to the multiple fountain nozzles. The control system is configured to independently control extension and retraction of each fountain nozzle of the multiple fountain nozzles, and to keep the body of at least one fountain nozzle of the multiple fountain nozzles extended without a liquid being discharged from the nozzle outlet of the at least one fountain nozzle.

In another embodiment, a method for utilizing a fountain system is provided. The method includes extending, via an extension system, a portion of a telescopic body of a fountain nozzle out of a liquid. The nozzle outlet is coupled to an end of the portion of the telescopic body extending out of the liquid. The method also includes activating, via an actuation system, discharge of the liquid from the nozzle outlet. The extension system and the actuation system function separately from each other.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
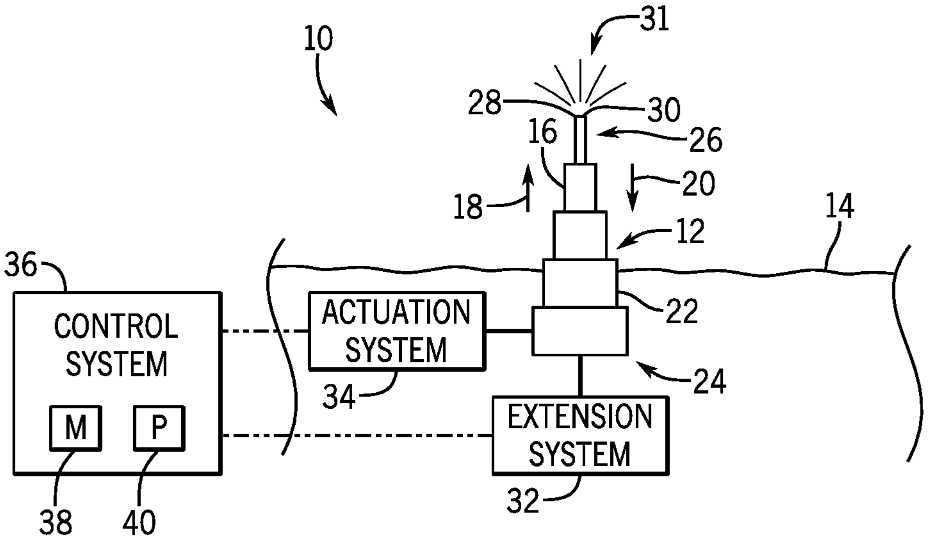
FIG. 1 is a schematic of an embodiment of a fountain system of a water attraction, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Amusement parks feature a wide variety of entertainment, such as amusement park rides, performance shows, and games. Embodiments of the present disclosure are directed to a fountain system for a water attraction (e.g., show) that may be utilized at an amusement park or other entertainment venue. A fountain system for a water attraction may include a fountain nozzle (e.g., telescopic fountain). The fountain nozzle may include a body that telescopes during extension and retraction. During retraction, the fountain nozzles may be completely submersed in the water. During extension a portion of the body may extend out of water. A nozzle outlet coupled to an end of the body (outside of the water) discharges water (or other liquid) provided to the fountain nozzle. The extension and retraction may occur via an extension system. In certain embodiments, the extension system may extend the body (e.g. to full length) and maintain the extension without water being discharged from the nozzle outlet. In certain embodiments, the extension system may include a piston (e.g., hydraulically or electrically operated piston) for extending and retracting the body of the fountain nozzle. In certain embodiments, the extension system comprises a pneumatic system (e.g., that utilizes air) to extend and retract the body of the fountain nozzle. Activation of the discharge of water from the nozzle outlet may occur via an actuation system. The actuation system is separate or discrete from the extension system. In certain embodiments, the actuation system may include a pump (e.g., for hydraulic actuation). In certain embodiments, that actuation system may include an air compressor/pump may be utilized (e.g., for pneumatic actuation). In certain embodiments, an electric feed for an electric actuator may be utilized for actuation. A control system may control both the extension and actuation systems. In certain embodiments, the fountain system may be a modular fountain system that includes multiple fountain nozzles. The control system, via the extension and actuation systems, may independently or separately control the extension and retraction and discharge of water of each fountain nozzle. Thus, if one or more of the fountain nozzles does not function, the remaining fountain nozzles may be utilized. In addition, utilizing distinct systems to control the extension and retraction and discharge of water expands the functionality of the telescopic fountain nozzles during the water attraction. This avoids having to utilize a large platform that supports dozens or hundreds of nozzles.

Figure 2:
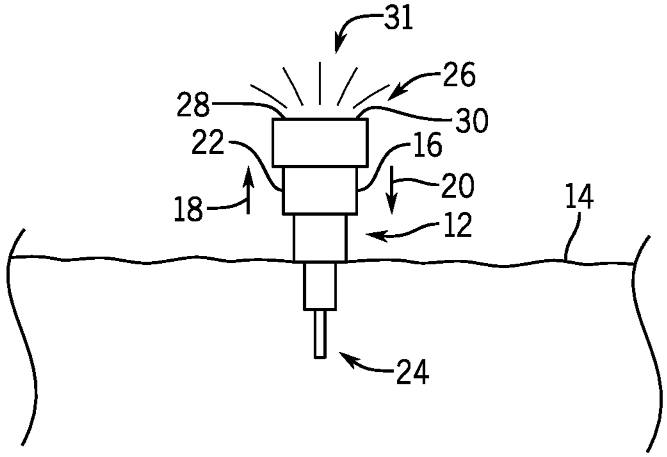
FIG. 2 illustrates an embodiment of a telescopic fountain nozzle body of the fountain system of FIG. 1, in accordance with an aspect of the present disclosure.

Turning to the figures, FIG. 1 illustrates an embodiment of a fountain system 10 of a water attraction (e.g., show). As depicted, the fountain system 10 includes a telescopic fountain or fountain nozzle 12 disposed within a body of water 14. The body of water 14 may be in a pond, lake, pool, tank, or building structure (e.g., located at an amusement park). The fountain nozzle 12 includes a body 16 (e.g., telescopic body) that extends in a first direction 18 (e.g., vertical direction) and retracts in a second direction 20 (e.g., opposite vertical direction). The body 16 telescopes when extending or retracting. In particular, the body 16 includes multiple segments 22 arranged in a concentric arrangement that extend from each other when extended and retract within each other when retracted (e.g., in a nested arrangement). As depicted, each subsequent segment 22 extending from the body 16 in direction 18 is narrower than the previous segments 22 below it. Thus, the body 16 narrows from a bottom portion 24 to a top portion 26 of the body 16. In certain embodiments, the body 16 widens from the bottom portion 24 to the top portion 26 (see FIG. 2). As depicted, the body 16 of the fountain nozzle 12 is fully extended so that a portion (e.g., top portion 26) is located out of the water 14 and a portion (e.g., bottom portion 24) is located within the water 14. In certain embodiments, an entirety of the body 16 may extend outside the water 14. The fountain nozzle 12 includes a nozzle outlet 28 located at an end 30 of the top portion 26 of the body 16 where water is discharged (e.g., indicated by reference numeral 31). In certain embodiments, nozzle outlets 28 may be disposed along the side of the body 16 for discharge of water from the fountain nozzle 12.

The fountain system 10 includes an extension system 32 that extends and retracts the body 16 of the fountain nozzle 12. As described in greater detail below, the extension system 32 may include a piston, pump, or other mechanism to extend and retract the body 16. The extension system 32 may fully extend, partially extend, fully retract, and/or partially retract the fountain nozzle 12. The fountain system 10 also includes an actuation system 34 that activates or causes the water to flow through the body 16 of the fountain nozzle 12 to be discharged via the nozzle outlet 28. As described in greater detail below, the actuation system 34 may include a pump, valves, compressor, or other mechanisms to control the discharge of water from the fountain nozzle 12. Both the extension system 32 and the actuation system 34 are coupled to a control system 36 (e.g., controller). The control system 36 controls the extension system 32 and the actuation system 34 to control the extension and retraction of the fountain nozzle 12 and the discharge of water from the fountain nozzle 12.

In certain embodiments, the extension system 32 and the actuation system 34 are two discrete or separate systems that are separately or independently controlled by the control system 36. In certain embodiments, this enables the body 16 of the fountain nozzle 12 to be extended without the discharge of water or other liquid from the nozzle 12.

The control system 36 includes a memory 38 and a processor 40 configured to execute instructions stored on the memory 38. The processor 40 may include multiple processors, one or more "general-purpose" microprocessors, one or more special-purpose microprocessors, and/or one or more application specific integrated circuits (ASICS), or some combination thereof. For example, the processor 40 may include one or more reduced instruction set (RISC) processor, advanced RISC machine (ARM) processor, performance optimization with enhanced RISC (PowerPC) processor, field-programmable gate array (FPGA) integrated circuit, graphics processing unit (GPU), or any other suitable processing device.

Figure 3:
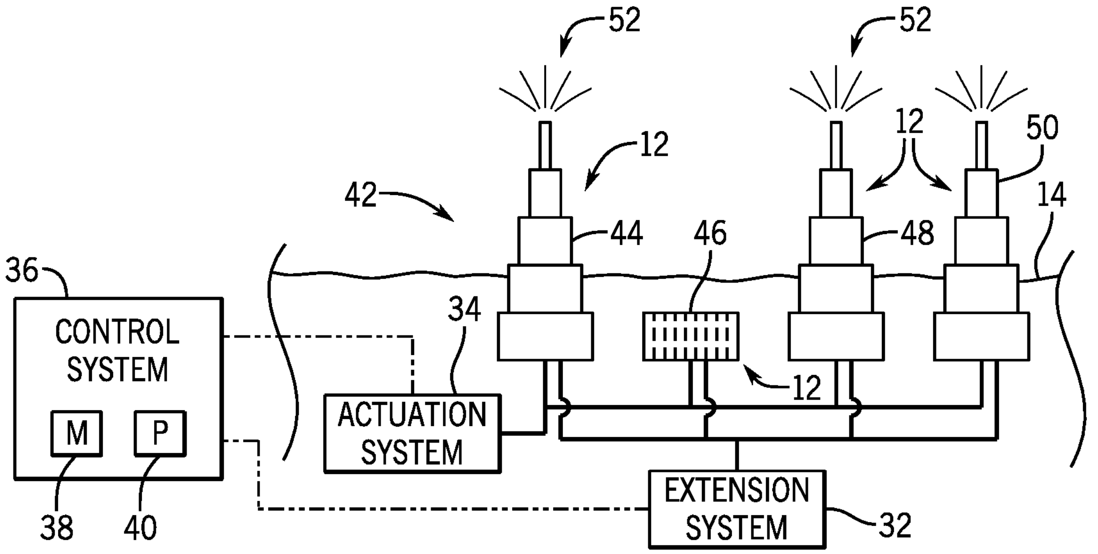
FIG. 3 illustrates an embodiment of a modular fountain system of a water attraction (e.g., having multiple telescopic fountain nozzles), in accordance with an aspect of the present disclosure.

The memory device 38 may include a volatile memory, such as random access memory (RAM), nonvolatile memory, such as read-only memory (ROM), flash memory, or any combination thereof. The memory device 38 may store a variety of information that may be used for various purposes. For example, the memory device 38 may store processor-executable instructions (e.g., firmware or software) for the processor 40 to execute, such as instructions for controlling the extension and retraction of the fountain nozzle 12, discharge of water or other liquid from the nozzle 12, flow rate of water into the nozzle, or other instructions related to the fountain system 10. The storage device(s) (e.g., nonvolatile storage) may include ROM, flash memory, a hard drive, or any other suitable optical, magnetic, or solid-state storage medium, or a combination thereof FIG. 3 illustrates an embodiment of a modular fountain system 42 of a water attraction (e.g., having multiple telescopic fountain nozzles 12). As depicted in FIG. 3, multiple telescopic fountain nozzles 12 as described in FIG. 1 may be coupled to the extension system 32, actuation system 34, and the control system 36 to form the modular fountain system 42. As depicted, the fountain nozzles 12 are disposed within the body of water 14. In certain embodiments, the fountain nozzles 12 may be disposed on a common platform. The control system 36, via the extension system 32, is configured to independently or separately control the extension and retraction of each fountain nozzle 12 of the modular fountain system 42. In other words, the control system 36 may cause one or more fountain nozzles 12 to extend, while some fountain nozzles 12 remain retracted. Also, the control system 36 may cause one or more fountain nozzles 12 to retract, while some fountain nozzles 12 remain extended. As depicted, the modular fountain system 42 includes four fountain nozzles 44, 46, 48, and 50. The number of fountain nozzles 12 may vary (e.g., 1, 2, 3, 4 5, 6, 7, 8, 9, 10, or any other number of fountain nozzles 12). As depicted, fountain nozzles 44, 48, and 50 are extended, while fountain nozzle 46 is retracted.

The control system 36, via the actuation system 34, is configured to independently or separately control the discharge of water or other liquid from each fountain nozzle 12. In other words, the control system 36 may cause one or more fountain nozzles 12 to discharge water, while some fountain nozzles 12 do not discharge water. As depicted, fountain nozzles 44 and 48 are discharging water as indicated by reference numeral 52. As mentioned above having discrete extension 32 and actuation systems 34 enables the fountain nozzle 12 to be extended without water being discharged from the fountain nozzle 12 (as depicted by the fountain nozzle 50).

Figure 4:
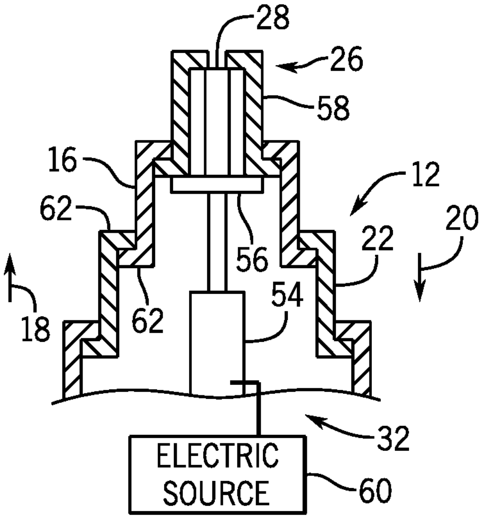
FIG. 4 illustrates an embodiment of an extension system (e.g., electrically actuated piston) interfacing with a portion of a telescopic fountain nozzle, in accordance with an aspect of the present disclosure.

FIG. 4 illustrates an embodiment of the extension system 32 (e.g., electrically actuated piston 54) interfacing with a portion of the telescopic fountain nozzle 12. The extension system 32 includes a piston 54 disposed within the body 16 of the fountain nozzle 12. The piston 54 includes a piston head 56 that interfaces with the top segment 58 of the body 16. The nozzle outlet (e.g., nozzle) is coupled to the piston head 56. In certain embodiments, the piston head 56 may interface with a different segment 22 of the body 16 and/or with more than one segment 22 of the body 16. As depicted, the piston 54 is coupled to an electric power source 60 that causes the piston head 56 to extend or retract from the piston 54. The electric power source 60 may be controlled by the control system 36. When the piston head 56 extends from the piston 54 in direction 18, it pushes on the top segment 58 of the body 16, causing the body 16 to extend. As depicted, each body segment 22 includes a lip or flange 62 that interfaces with the lip or flange 62 of the adjacent body segment 22 below it. As an upper force is exerted on the top segment 58, the top segment's flange 62 exerts an upper force on the flange 62 of the adjacent segment 22 causing it to lift upward, while a similar interaction occurs along the flange interfaces of the other segments 22, thus, causing the telescoping extension of the body 16. When the piston head 56 retracts toward the piston 54 in direction 20, the segments 22 of the body 16 retract or nest within each other.

In certain embodiments, as an alternative to a piston, the extension system 32 may include a threaded insert extending out of a tapped segment (e.g., similar to a hollowed-out version of an electric lead screw). The tapped segment may be similar to the piston head extend and/or retract the segments 22 of the body 16.

Figure 5:
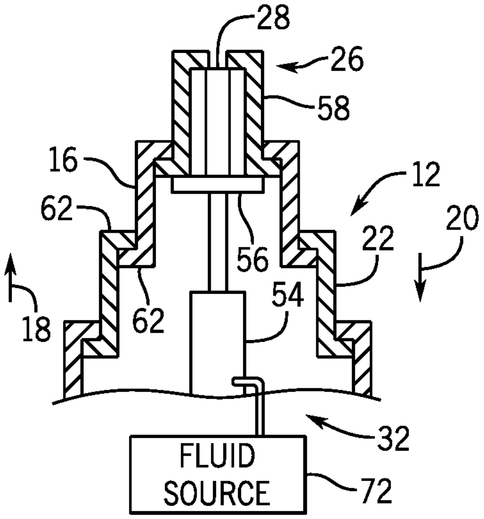
FIG. 5 illustrates an embodiment of an extension system (e.g., hydraulically actuated piston) interfacing with a portion of a telescopic fountain nozzle, in accordance with an aspect of the present disclosure.

FIG. 5 illustrates an embodiment of the extension system 32 (e.g., hydraulically actuated piston or pneumatically actuated piston 54) interfacing with a portion of the telescopic fountain nozzle 12. The piston 54 is as described in FIG. 4 except the piston 54 is hydraulically or pneumatically actuated. Thus, movement of the piston head 56 is actuated via a fluid (e.g., air, water, etc.) within the piston 54.

Figure 6:
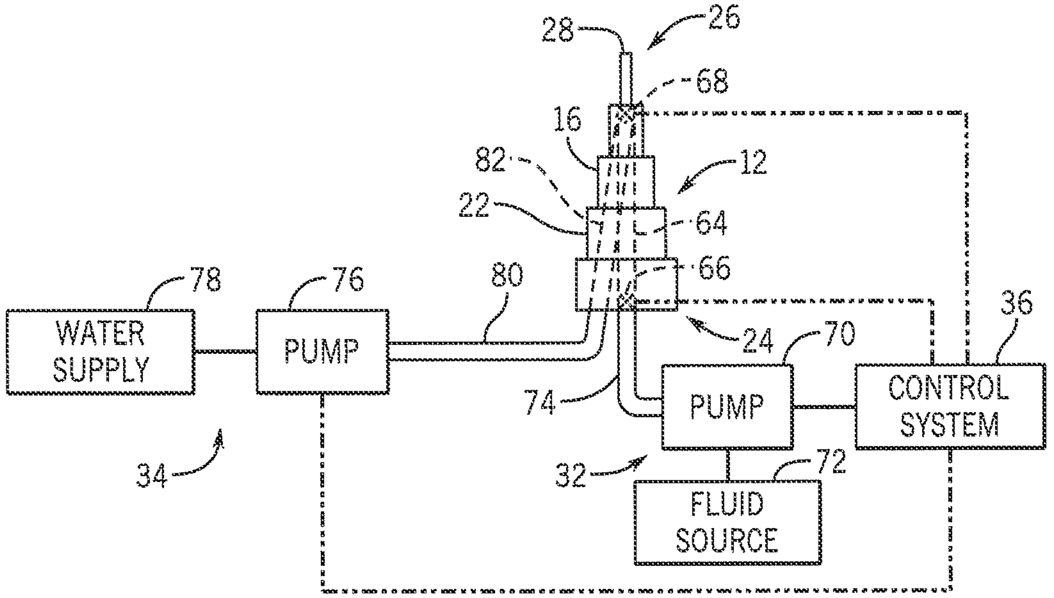
FIG. 6 illustrates an embodiment of a fountain system including an extension system and actuation system interfacing with a telescopic fountain nozzle, in accordance with an aspect of the present disclosure.

FIG. 6 illustrates an embodiment of the fountain system 10 that includes the extension system 32 and actuation system 34 interfacing with the telescopic fountain nozzle 12. The telescopic fountain nozzle 12 is as described above. As depicted, the extension system 32 includes a conduit 64 that extends through the body 16 of the telescopic nozzle 12. One or more valves may be disposed along the conduit 64 at different locations. As depicted, a valve 66 is disposed along the conduit 64 within the segment 22 at the bottom portion 24 of the body 16. In addition, a valve 68 is disposed along the conduit 64 adjacent the segments 22 near the top portion 26 of the body 16. The extension system 32 also includes a pump 70 coupled to a fluid source 72 (e.g., water, air in a pneumatic system, etc.). The pump 70 is coupled to conduit 64 via conduit 74 and is configured to provide the fluid (e.g., water, air, etc.) to the conduit 64. In certain embodiments, conduit 64 may be coupled to the nozzle outlet 28. Providing the fluid to the conduit 64 extends the body 16 of the telescopic nozzle 12. The control system 36 is coupled to and controls the pump 70 and the valves 66, 68. The control system 36 may open valve 66 and close valve 68 and cause the pump 70 to pump fluid into the conduit 64 to extend the body 16. Upon the desired extension of the body 16, the control system 36 may close the valve 66 to maintain the extension of the body 16, while ceasing flow of fluid from the pump 70. In certain embodiments, the extension of the body 16 may be maintained without activating the discharge of water from the nozzle outlet 28. In certain embodiments, an outlet may be coupled to conduit 64 and/or conduit 74 to release the fluid from within conduit 64 (e.g., when valve 66 is opened) to enable the retraction of the body 16.

In certain embodiments, a separate activation system 34 is also coupled to the control system 36 for activating discharge of water from the nozzle outlet 28. As depicted, the activation system 34 includes a pump 76 coupled to a water supply 78 (e.g., the body of water 14). The pump 76 is coupled to a conduit 80. As depicted, conduit 80 is coupled to a conduit 82 (e.g., separate from conduit 64) disposed within the body 16. Conduit 82 is coupled to the nozzle outlet 28. In certain embodiments, conduit 82 may be disposed within one or more walls of the body 16. In certain embodiments, conduit 82 may be disposed within a space (e.g., cavity) between the walls of the body 16. Upon a signal from the control system 36, the pump 76 provides water to the conduit 82 for discharge from the nozzle outlet 28. In certain embodiments, conduit 80 or 82 may be coupled (e.g., fluidly coupled) to the conduit 64 to provide water for discharge from the nozzle outlet 28 when valve 68 is open. In certain embodiments, the system 10 may utilize a single pump for both extension and activation of water discharge.

Figure 7:
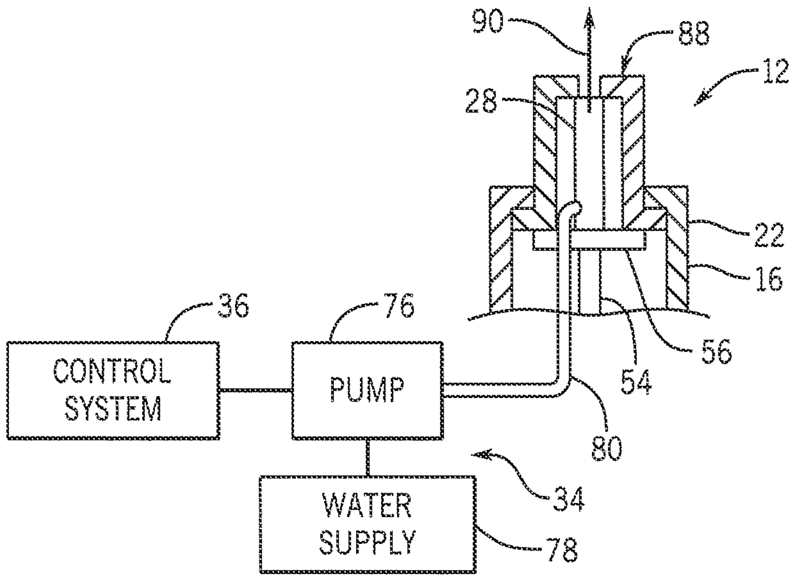
FIG. 7 illustrates an embodiment of an actuation system interfacing with a portion of a telescopic fountain nozzle, in accordance with an aspect of the present disclosure.

FIG. 7 illustrates an embodiment of the actuation system 34 interfacing with a portion of the telescopic fountain nozzle 12. The actuation system 34 includes the pump 76, water supply 78, and the conduit 80 as described above. The fountain nozzle 12 includes the piston 54 as described above (e.g., electrically or hydraulically actuated) in an extended position extending the body 16. Upon the pump 76 providing water to the nozzle outlet 28, via the conduit 80 (e.g., flexible hose or rigid fitting coupled to nozzle outlet 28), water is discharged from the fountain nozzle 12 (as indicated by reference numeral 90).

Figure 8:
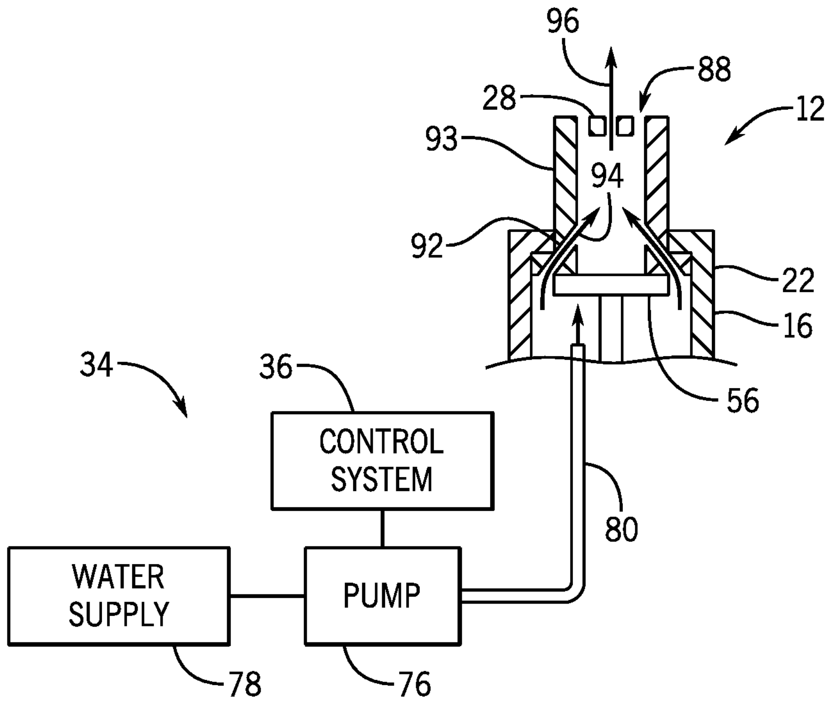
FIG. 8 illustrates an embodiment of an actuation system interfacing with a portion of a telescopic fountain nozzle (e.g., having water pathways in a wall of the telescopic fountain nozzle), in accordance with an aspect of the present disclosure.

FIG. 8 illustrates an embodiment of the actuation system 34 interfacing with the portion of the telescopic fountain nozzle 12 (e.g., having water pathways in walls of telescopic fountain nozzle 12). The actuation system 34 includes the pump 76, water supply 78, and the conduit 80 as described above. The fountain nozzle 12 includes the piston head 56 as described above (e.g., electrically or hydraulically actuated) in an extended position extending the body 16. Passages 92 extend through a wall 93 of the top segment 22 of the body 16. Upon the pump 76 providing water to the fountain nozzle 12, via the conduit 80, the water passes through the passages 92 (as indicated by reference numeral 94) and through passages 88 (as indicated by reference numeral 96) that form the nozzle outlet 28 for discharge of water from the fountain nozzle 12. As depicted, the passages 92 are fluidly coupled to an interior (e.g. cavity) within the body 16. In certain embodiments, the passages 92 may be only located within one or more walls 93 of one or more segments 22 of the body 16 with the conduit 80 directly coupled to the passages 92.

Figure 9:
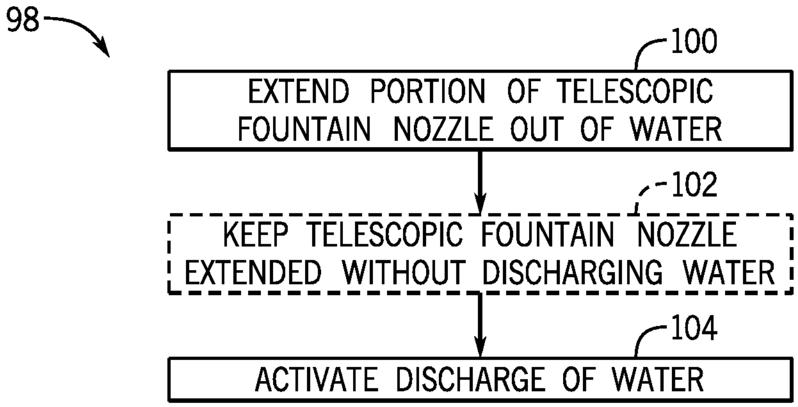
FIG. 9 is a flow chart of an embodiment of a method for utilizing a fountain system of a water attraction, in accordance with an aspect of the present disclosure.

FIG. 9 is a flow chart of an embodiment of a method 98 for utilizing the fountain system 10 of a water attraction. One or more of the steps of the method 98 may be performed by the control system 36 (e.g., via the extension system 32 and the actuation system 34). One or more of the steps of the method 98 may be performed simultaneously and/or in a different order from that depicted. In addition, the method 98 may be performed utilizing a single fountain nozzle 12 or one or more fountain nozzles of a modular fountain system. The method 98 includes extending, via the extension system 32, a portion of the telescopic fountain nozzle 12 out of the water (block 100). In certain embodiments, the method 98 includes keeping the telescopic fountain nozzle 12 extended without discharging water from the nozzle outlet 28 (block 102). The method 98 also includes activating, via the actuation system 34, the discharge of water from the nozzle outlet 28. In certain embodiments, the extension system 32 and the actuation system 34 are discrete systems that function separately from each other as described above.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A fountain system, comprising:
- a fountain nozzle comprising:
  - a body configured to telescope during extension and retraction, wherein the body comprises a plurality of segments in a concentric arrangement with respect to each other, and the plurality of segments extend from each other when extended and retract within each other when retracted; and
  - a nozzle outlet disposed on an innermost segment of the plurality of segments, the innermost segment being an uppermost end of the body when extended;
- an extension system configured to actuate the extension and retraction of the body; and
- an actuation system configured to activate discharge of a liquid from the nozzle outlet;
- wherein the extension system and the actuation system are discrete systems, and wherein the extension system comprises a conduit that extends into the body and a pump coupled to the conduit that is configured to flow the liquid into the body of the fountain nozzle via the conduit so that the liquid directly acts on each segment of the plurality of segments of the fountain nozzle to extend the body of the fountain nozzle, and wherein the extension system comprises a valve disposed along the conduit, wherein the extension system is configured to close the valve when the body is fully extended to keep the liquid within the body to keep the body fully extended.

2. The fountain system of claim 1, wherein the extension system is configured to keep the body extended without the liquid being discharged from the nozzle outlet.

3. The fountain system of claim 1, wherein the fountain nozzle is one of a plurality of fountain nozzles and the fountain system comprises the plurality of the fountain nozzles, and the extension system is configured to independently control extension and retraction of each fountain nozzle of the plurality of fountain nozzles.

4. The fountain system of claim 3, wherein the actuation system is configured to independently control the discharge of the liquid from each fountain nozzle.

5. The fountain system of claim 1, wherein the actuation system comprises an additional conduit that extends into the body toward the nozzle outlet and an additional pump coupled to the additional conduit and configured to flow the liquid into the nozzle outlet via the additional conduit for discharge of the liquid.

6. A modular fountain system, comprising:
- a plurality of fountain nozzles, wherein each fountain nozzle of the plurality of fountain nozzles comprises:
  - a body configured to telescope during extension and retraction, wherein the body comprises a plurality of segments in a concentric arrangement with respect to each other, and the plurality of segments extend from each other when extended and retract within each other when retracted; and
  - a nozzle outlet disposed on an innermost segment of the plurality of segments, the innermost segment being an uppermost end of the body when extended;
- a control system coupled to the plurality of fountain nozzles, wherein the control system is configured to independently control extension and retraction of each fountain nozzle of the plurality of fountain nozzles and to keep the body of at least one fountain nozzle of the plurality of fountain nozzles extended without a liquid being discharged from the nozzle outlet of the at least one fountain nozzle;

an extension system configured to actuate extension and retraction of one or more respective fountain nozzles of the plurality of fountain nozzles; and an actuation system configured to activate discharge of the liquid from the nozzle outlet of one or more respective fountain nozzles of the plurality of fountain nozzles, wherein the control system is coupled to and controls the extension system and the actuation system, wherein the extension system and the actuation system are discrete systems, and wherein the extension system comprises a conduit that extends into the body of the at least one fountain nozzle and a pump coupled to the conduit that is configured to flow the liquid into the body of the at least one fountain nozzle via the conduit so that the liquid directly acts on each segment of the plurality of segments of the at least one fountain nozzle to extend the body of the at least one fountain nozzle, and wherein the extension system comprises a valve disposed along the conduit, wherein the extension system is configured to close the valve when the body is fully extended to keep the liquid within the body to keep the body fully extended.

7. The modular fountain system of claim 6, wherein the control system is configured to separately control actuation of discharge of the liquid from each fountain nozzle of the plurality of fountain nozzles.

* * * * *